May 27, 1958     O. L. SPAETH     2,836,263
REMOTE CONTROL BRAKE FOR PHONOGRAPH TURNTABLE
Filed May 21, 1954
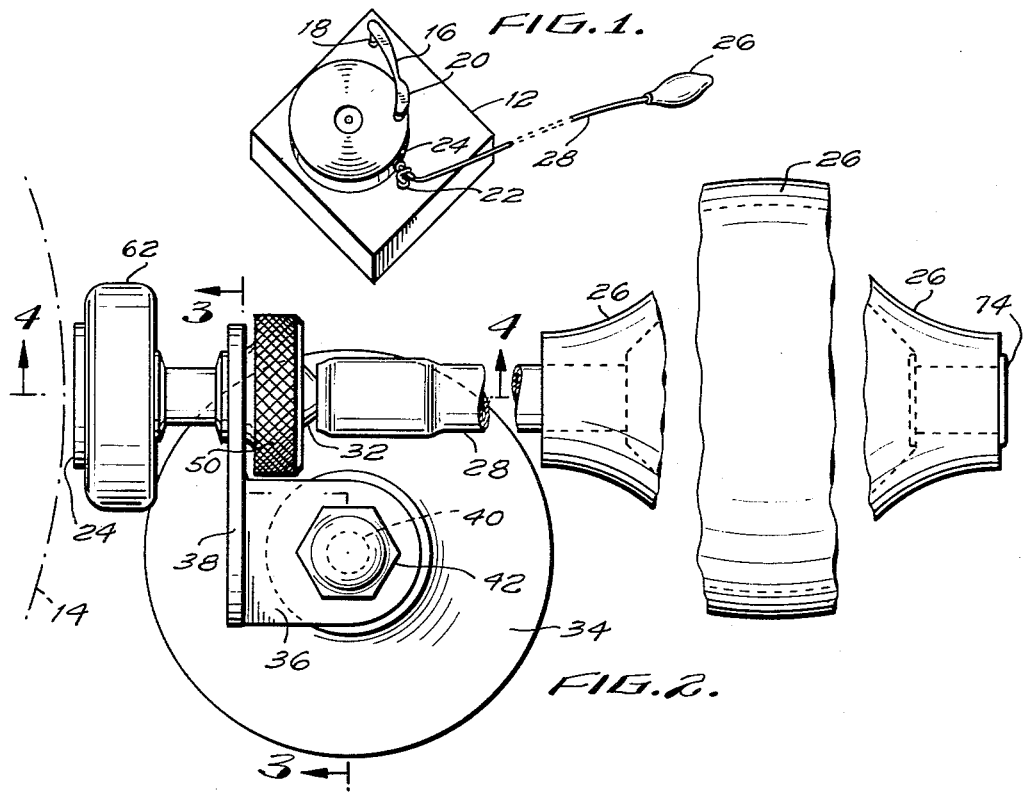
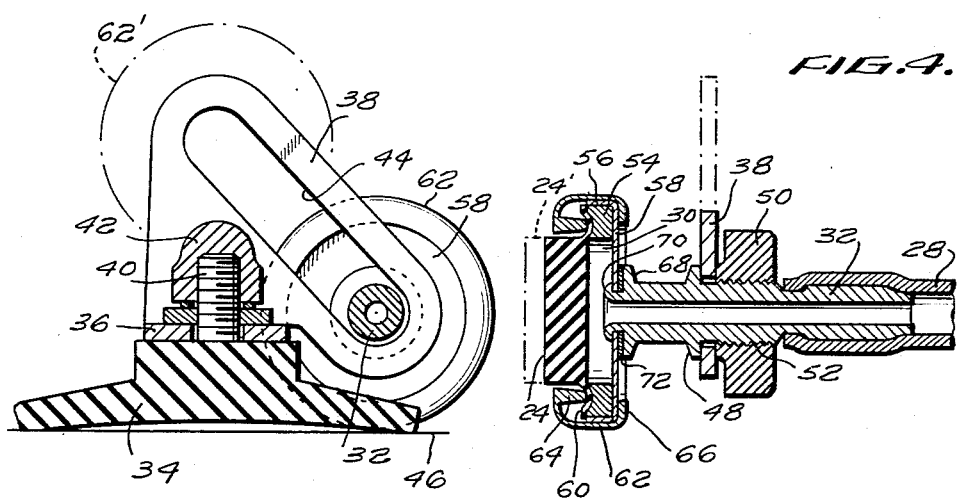
INVENTOR.
OTTO L. SPAETH
BY James and Franklin
ATTORNEYS

United States Patent Office 2,836,263
Patented May 27, 1958

2,836,263

REMOTE CONTROL BRAKE FOR PHONOGRAPH TURNTABLE

Otto L. Spaeth, New York, N. Y., assignor to The Spaeth Foundation, New York, N. Y., a corporation of New York Application May 21, 1954, Serial No. 431,386

2 Claims. (Cl. 188—74)

This invention relates to sound reproducing equipment, and more particularly to phonograph or transcription devices and a brake mechanism for momentary or intermittent stopping of the same.

Phonographs are used not only for entertainment but also for study. A music student may study a musical recording, or a language student a language recording. The primary object of the present invention is to improve phonographs for use by students. A more specific object is to provide an accessory which operates as a remotely controllable brake and which is readily added to substantially all types of phonograph. A further object is to provide such an accessory which is readily removed from the phonograph without marring the appearance of the same, and thus is readily transferrable to another phonograph. Indeed the accessory is so compact and light that it may be pocketed and carried by a student for use on a phonograph wherever located.

To accomplish the foregoing general objects, and other more specific objects which will hereinafter appear, my invention resides in the remote control brake elements, and their relation one to another and to the phonograph, as are hereinafter more particularly described in the following specification. The specification is accompanied by a drawing, in which:

Fig. 1 is a perspective view showing a phonograph brake embodying features of my invention applied to a conventional phonograph;

Fig. 2 is a plan view of the brake mechanism, drawn to enlarged scale;

Fig. 3 is a section taken approximately on the plane of the line 3—3 of Fig. 2; and Fig. 4 is a section taken approximately on the plane of the line 4—4 of Fig. 2.

Referring to the drawing, and more particularly Fig. 1, the phonograph comprises a base 12 housing a suitable driving motor and conventional drive mechanism, commonly arranged nowadays for multiple speed drive. The controls for stopping, starting and speed change have been omitted in Fig. 1, but it will be understood that even when such devices are disposed close to the rotatable element, most of the periphery of the rotatable element is nevertheless left free and accessible. The pickup arm is indicated at 16, it being pivoted at 18, and at its forward end carrying one or more stylii for vibrating a pickup, which may be of the crystal or magnetic variable reluctance or other suitable type, and which is housed at 20.

The remote control brake is here shown as an accessory comprising a support 22 adapted to be mounted adjacent the periphery of the rotatable element. There is a friction brake shoe 24 movable toward and away from the periphery of the rotatable element, and a remote control element 26 connected to the brake shoe by a suitable flexible means 28. In the specific mechanism shown the control means is a manually operable air compressing means, which in simplest form may be a squeezable air bulb such as those used for syringes, and the connection means 28 is a relatively slender long flexible tube.

Referring now to Fig. 4, the brake mechanism comprises an air chamber 30 and a brake shoe 24 which is movable toward and away from the periphery of the rotatable element, as indicated by the dotted position 24', and which acts as one end of the air chamber 30. The brake shoe is preferably made of rubber. The flexible tube 28 is secured to a nipple 32, the opposite end of which is connected to the air chamber 30. It will thus be seen that squeezing the bulb forces the brake shoe 24 against the rotatable element for so long as the bulb is squeezed.

Referring now to Fig. 3, the support for the brake mechanism preferably employs a rubber suction cup 34 as its base. This is initially more steeply conical in shape, and is shown in its squeezed-down position in Fig. 3. Inasmuch as the top surface of the phonograph near the rotatable element is ordinarily a smooth metal plate or a highly polished wood panel, the suction cup holds effectively to such a surface. The use of a suction cup makes it possible to position the brake on substantially all types of phonograph, and at any convenient point around the periphery of the rotatable element. By using a suction cup the accessory may be removed without marring the phonograph.

Referring now to Figs. 2 and 3, the suction cup carries a metal bracket having a horizontal part 36 and a vertical part 38. The horizontal part 36 is secured to the suction cup by means of a screw 40 and an ornamentally finished nut 42. An appropriate washer or/and lock washer may be used beneath the nut. The vertical part 38 is preferably slotted as shown at 44. This slot makes it possible to adjust the height of the brake relative to the suction cup, so that it will best fit the height of the rotatable element in any particular phonograph. It is convenient to dispose the slot 44 at an angle as shown in Fig. 3 instead of vertically, thus permitting the nipple 32 to move past the nut 42, and so making it possible to lower the brake substantially all the way down to the top surface 46 of the phonograph, as shown in solid lines in Fig. 3.

Referring now to Fig. 4, it will be seen that the nipple 32 is formed with a flange 48 which bears against one side of the bracket 38, while a preferably knurled nut 50 bears against the other side. The nut 50 is threadedly received on a threaded portion 52 of the nipple 32. With this arrangement the adjustment for proper height of the brake may be made readily without the use of tools. In practice the change of height is rarely needed, but when needed is readily accomplished as described above, by turning the nut 50. The knurling is best shown in Fig. 2.

The chamber 30 (Fig. 4) is made up of an annular spacer 54 received within the flange 56 of a back plate 58. The momentary brake shoe 24 is made of rubber or like flexible material, and is formed integrally with a flange 60, which acts as a yieldable diaphragm. This flange is clamped against the spacer ring 54 by means of a clamping ring 62, the latter including a part 64 which bears against the flange 60, and an opposite part 66 which is crimped or spun inwardly around the back plate 58 in order to complete the assembly. The end of nipple 32 has a flange 68 and a rivet portion the end of which is spread or riveted outwardly as shown at 70. A gasket 72 may be inserted during the assembly operation to make the chamber leak-proof.

It will be understood that the compressible air bulb 26 (Fig. 2) may be like those commonly used in syringes, and that it is accordingly provided with an air inlet or check valve, indicated at 74.

It is believed that the construction and method of use of my remote control brake for phonographs, as well as the advantages thereof, will be apparent from the foregoing description. The accessory is small, light, portable, and readily applied to almost any phonograph, and without marring the same. The brake opposes the motor, but the brake cannot be left on, for it automatically releases when one's grip is relaxed. The tube is flexible and the brake may be applied without shaking or jarring the phonograph.

It will also be apparent that while I have shown and described the invention in a preferred form, changes may be made in the structure shown, without departing from the scope of the invention, as sought to be defined in the following claims. In the claims I have for convenience referred to the bulb or remote control element as being manually operable, but this is not intended to exclude foot operation, which may be more convenient in the case of a violinist or pianist or other such instrumentalist playing along with a record, or in the case of a language student taking written notes.

I claim:

1. A light-weight pocketable remote control brake for a phonograph for momentary or intermittent stopping of the rotatable element, said brake comprising a rubber suction cup acting as a support and adapted to be readily temporarily positioned on substantially all types of phonographs immediately adjacent the periphery of the rotatable element, an enclosed air chamber, a friction brake shoe movable radially of the rotatable element toward and away from the periphery of the rotatable element and acting as one end of the air chamber, a metal bracket secured to said suction cup, means including a manually operable screw element on said bracket for raising or lowering the air chamber and shoe relative to the suction cup in order to fit the height of the rotatable element, a remote control manually squeezable means to compress air, and a flexible tube extending between the last said means and said air chamber, whereby squeezing of said means forces the brake shoe against the rotatable element for only so long as the said means is squeezed, without shaking or jarring the phonograph.

2. A light-weight pocketable remote control brake for a phonograph for momentary or intermittent stopping of the rotatable element, said brake comprising a rubber suction cup acting as a support and adapted to be readily temporarily positioned on substantially all types of phonographs immediately adjacent the periphery of the rotatable element, an enclosed air chamber, a friction brake shoe movable radially of the rotatable element toward and away from the periphery of the rotatable element and acting as one end of the air chamber, a slotted metal bracket secured to said suction cup, means including a manually operable knurled screw element movable in the slot of said bracket for raising or lowering the air chamber and shoe relative to the suction cup in order to fit the height of the rotatable element, a remote control manually squeezable air bulb, and a thin flexible tube extending between said bulb and said air chamber for remote control of the brake, whereby squeezing of said bulb forces the brake shoe against the rotatable element for only so long as the said bulb is squeezed, without shaking or jarring the phonograph.

References Cited in the file of this patent
UNITED STATES PATENTS

| | | |
|---|---|---|
| 348,868 | Straube | Sept. 7, 1886 |
| 1,022,656 | Brunt | Apr. 9, 1912 |
| 1,171,410 | Bono | Feb. 15, 1916 |
| 2,180,255 | Previn | Nov. 14, 1939 |
| 2,251,443 | Fawick | Aug. 5, 1941 |
| 2,257,610 | Kraft | Sept. 30, 1941 |
| 2,426,241 | Rodman | Aug. 26, 1947 |
| 2,711,802 | Davis | June 28, 1955 |